(12) United States Patent
Davis et al.

(10) Patent No.: US 8,113,480 B2
(45) Date of Patent: Feb. 14, 2012

(54) FRAME SUPPORT FOR WIND TURBINE

(75) Inventors: John P. Davis, Greer, SC (US); James D. Antalek, Valatie, NY (US); Win Nguyen, Gulf Breeze, FL (US)

(73) Assignee: General Electric Company, Schenectady, NY (US)

( * ) Notice: Subject to any disclaimer, the term of this patent is extended or adjusted under 35 U.S.C. 154(b) by 506 days.

(21) Appl. No.: 12/141,953

(22) Filed: Jun. 19, 2008

(65) Prior Publication Data
US 2009/0314922 A1    Dec. 24, 2009

(51) Int. Cl.
*F16M 1/00* (2006.01)

(52) U.S. Cl. ............. 248/637; 290/55; 290/44; 416/41; 416/117; 415/4.1

(58) Field of Classification Search .................. 290/44, 290/55; 415/4.1; 416/41, 117, 118; 248/637
See application file for complete search history.

(56) References Cited

U.S. PATENT DOCUMENTS

| | | | | |
|---|---|---|---|---|
| 279,194 A * | 6/1883 | Sickles | .......................... | 416/88 |
| 325,025 A * | 8/1885 | Tefft | .............................. | 416/52 |
| 512,712 A * | 1/1894 | Kelso | .............................. | 416/41 |
| 609,378 A * | 8/1898 | Weitzel | .......................... | 416/50 |
| 842,054 A * | 1/1907 | Barker | .......................... | 416/111 |
| 1,321,415 A * | 11/1919 | Brown | .......................... | 416/118 |
| 2,383,426 A * | 8/1945 | Tanenbaum | .................. | 212/172 |
| 2,388,377 A * | 11/1945 | Albers | .......................... | 290/55 |
| 2,888,111 A * | 5/1959 | Evans | ............................ | 52/114 |
| 3,752,326 A * | 8/1973 | Levingston | .................. | 212/198 |
| 4,074,818 A * | 2/1978 | Ray | ............................. | 414/138.5 |
| 4,113,112 A * | 9/1978 | Ray | ................................. | 212/71 |
| 4,118,637 A * | 10/1978 | Tackett | .......................... | 290/55 |
| 4,130,380 A * | 12/1978 | Kaiser | ...................... | 416/197 A |
| 4,183,717 A * | 1/1980 | Yamada | ........................ | 416/121 |
| 4,557,666 A * | 12/1985 | Baskin et al. | .................. | 416/32 |
| 4,569,453 A * | 2/1986 | Oustad | .......................... | 212/299 |
| 6,979,175 B2 * | 12/2005 | Drake | ............................ | 416/11 |
| 7,126,236 B2 | 10/2006 | Harbourt et al. | | |
| 2004/0197188 A1 * | 10/2004 | Drake | .......................... | 415/4.1 |
| 2004/0245201 A1 * | 12/2004 | Paschke | ........................ | 212/298 |
| 2008/0023432 A1 * | 1/2008 | Paschke | ........................ | 212/298 |

\* cited by examiner

*Primary Examiner* — Terrell McKinnon
*Assistant Examiner* — Daniel J Breslin
(74) *Attorney, Agent, or Firm* — William F. Heinze; Ernest G. Cusick; Frank A. Landgraff

(57) ABSTRACT

A support for a wind turbine having rear frame extending from a bedplate, where the support includes at least one tension member extending between the rear frame and the bedplate.

10 Claims, 4 Drawing Sheets

US 8,113,480 B2

FRAME SUPPORT FOR WIND TURBINE

BACKGROUND OF THE INVENTION

1. Technical Field

The subject matter described here generally relates to wind turbines, and, more particularly, to a frame support for a wind turbine.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18.

Commonly-assigned U.S. Pat. No. 7,126,236 for "Methods and Apparatus for Pitch Control Power Conversion" is incorporated by reference here and partially reproduced in FIG. 2. In FIG. 2, the drive train 8 of the wind turbine 4 (shown in FIG. 1) includes a main rotor shaft 116 connected to hub 110 and the gear box 12. The control system 16 (FIG. 1) includes one or more microcontrollers within panel 112 which provide control signals to variable pitch blade drive 114. A high speed shaft (not shown in FIG. 2) is used to drive a first generator 120 via coupling 122. Various components are supported by a frame 132. The frame 132 typically includes a main frame or "bedplate" portion, and generator support frame or "rear frame" portion that is cantilevered from the bedplate. However, the frame 132 may, under certain conditions, be subject to high stresses that can cause fatigue cracking and/or failure, particularly at the joint between the bedplate and the generator support frame.

BRIEF DESCRIPTION OF THE INVENTION

These and other drawbacks associated with such conventional approaches are addressed here in by providing, in various embodiments, a support for a wind turbine having rear frame extending from a bedplate, where the support includes at least one tension member extending between the rear frame and the bedplate.

BRIEF DESCRIPTION OF THE DRAWINGS

Various aspects of this technology will now be described with reference to the following figures ("FIGs.") which are not necessarily drawn to scale, but use the same reference numerals to designate corresponding parts throughout each of the several views.

DETAILED DESCRIPTION OF THE INVENTION

Figure 1:
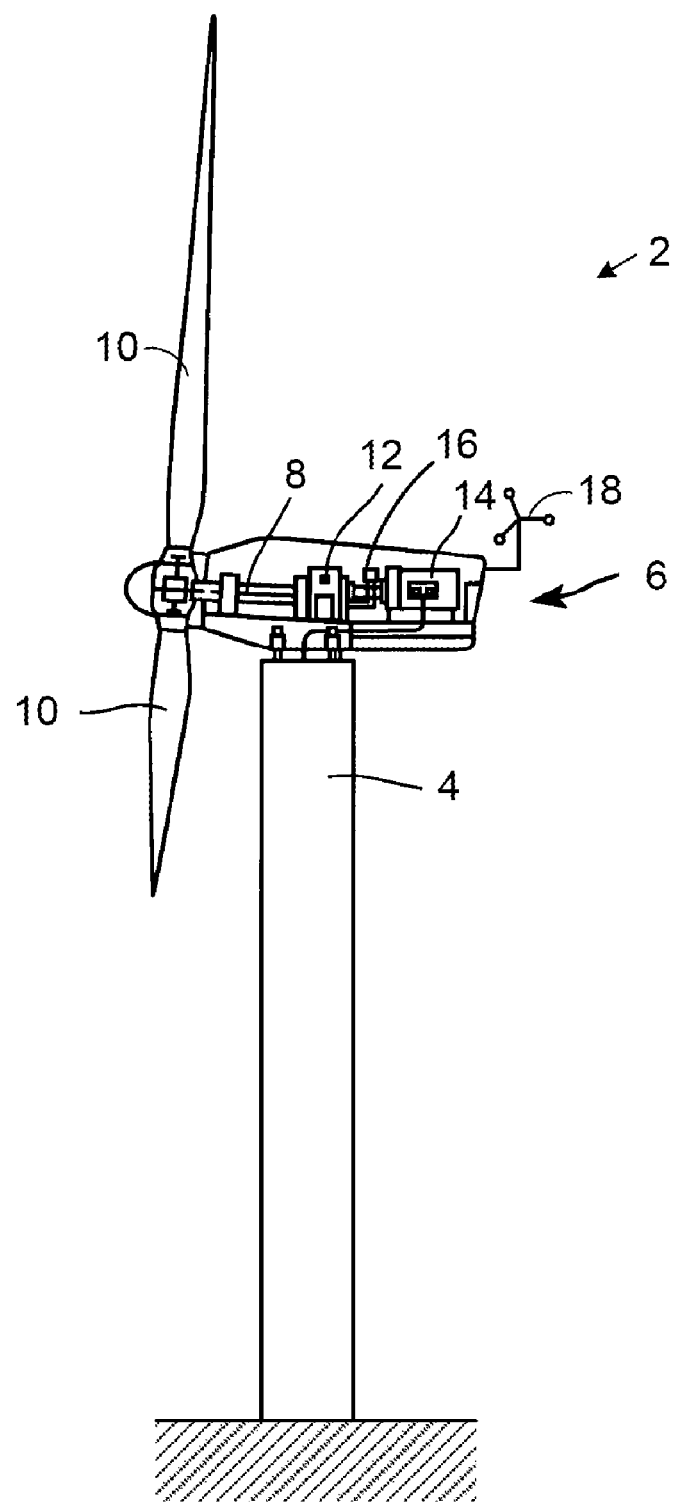
FIG. 1 is a schematic side view of a conventional wind generator.
Figure 2:
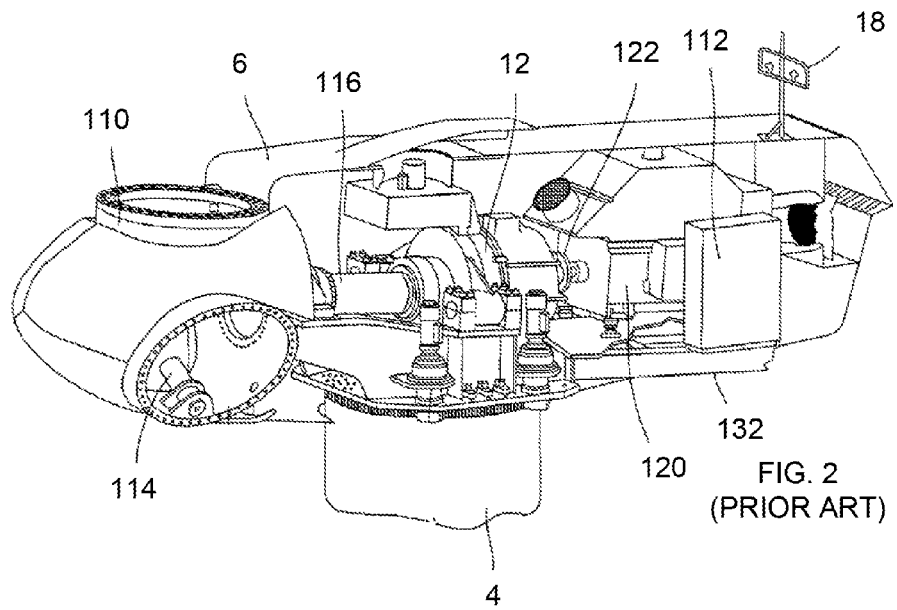
FIG. 2 is a cut-away orthographic view of the nacelle and hub of the conventional wind generator shown in FIG. 1.
Figure 3:
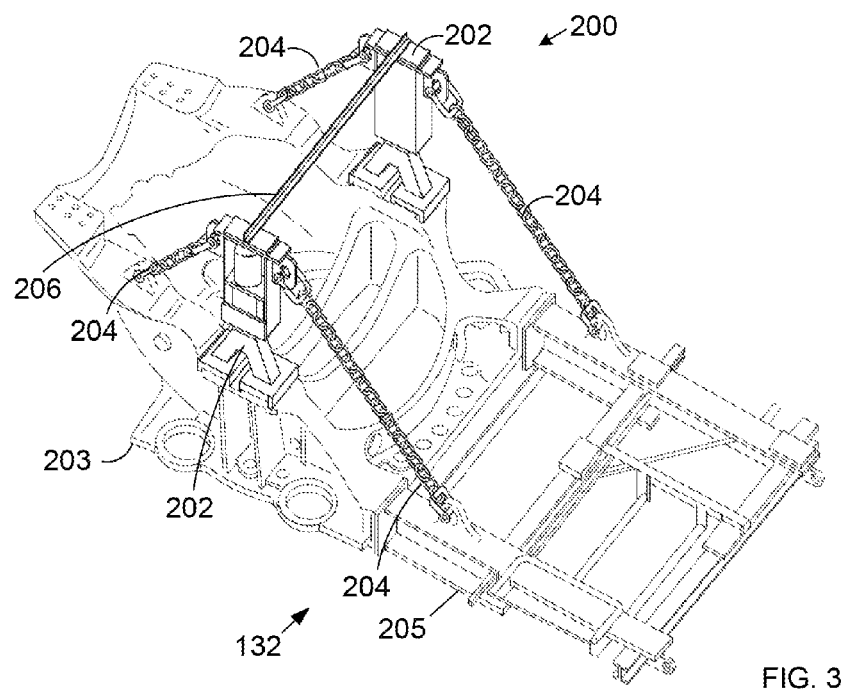
FIG. 3 is an orthographic view of a frame support for a wind turbine.

FIG. 3 illustrates one example of a frame support 200 for a wind turbine 4 having frame 132 (FIG. 1) with a bedplate 203 that is connected to a rear frame 205. However, the frame support 200 may also be used with other frame configurations. such as a bedplate 203 and rear frame 205 that are formed a single, contiguous unit or more than two units. The frame support 200 may be provided in newly installed construction and/or retrofitted into existing construction.

In these examples, the frame support 200 includes two stands 202, with one stand 202 extending from each side of the bedplate 203 portion of the frame 132. However, any other number of stands 202 and/or stand positions may also be used. For example, the stands 202 may be provided on the rear frame 205 portion of the frame 132.

A tension member 204 extends from each of the forward and rear sides of each of the illustrated stands 202. One of the tension members 204 connects to the rear frame 205 portion of the frame 132 while the other tension member connects to the bedplate 203. However, any other number of tension members may be provided with either or both of the stands 202. For example, a single tension member may extend from the stand 202 to the rear frame 205. The tension members 204 may also be connected directly between the bedplate 203 and rear frame 205 without a stands 202.

The illustrated tension members 204 are flexible chains. However, other flexible and inflexible tension members may also be used such as ropes, bars, beams, straps, or webs. Alternatively, or in addition, a stand (not shown) may extend from the opposite side of the frame 132 with compression members (nor shown) connecting the downwardly extending stand to the rear frame 205 and/or or bedplate 203 on the opposite side of the frame 132.

Figures 4, 5:
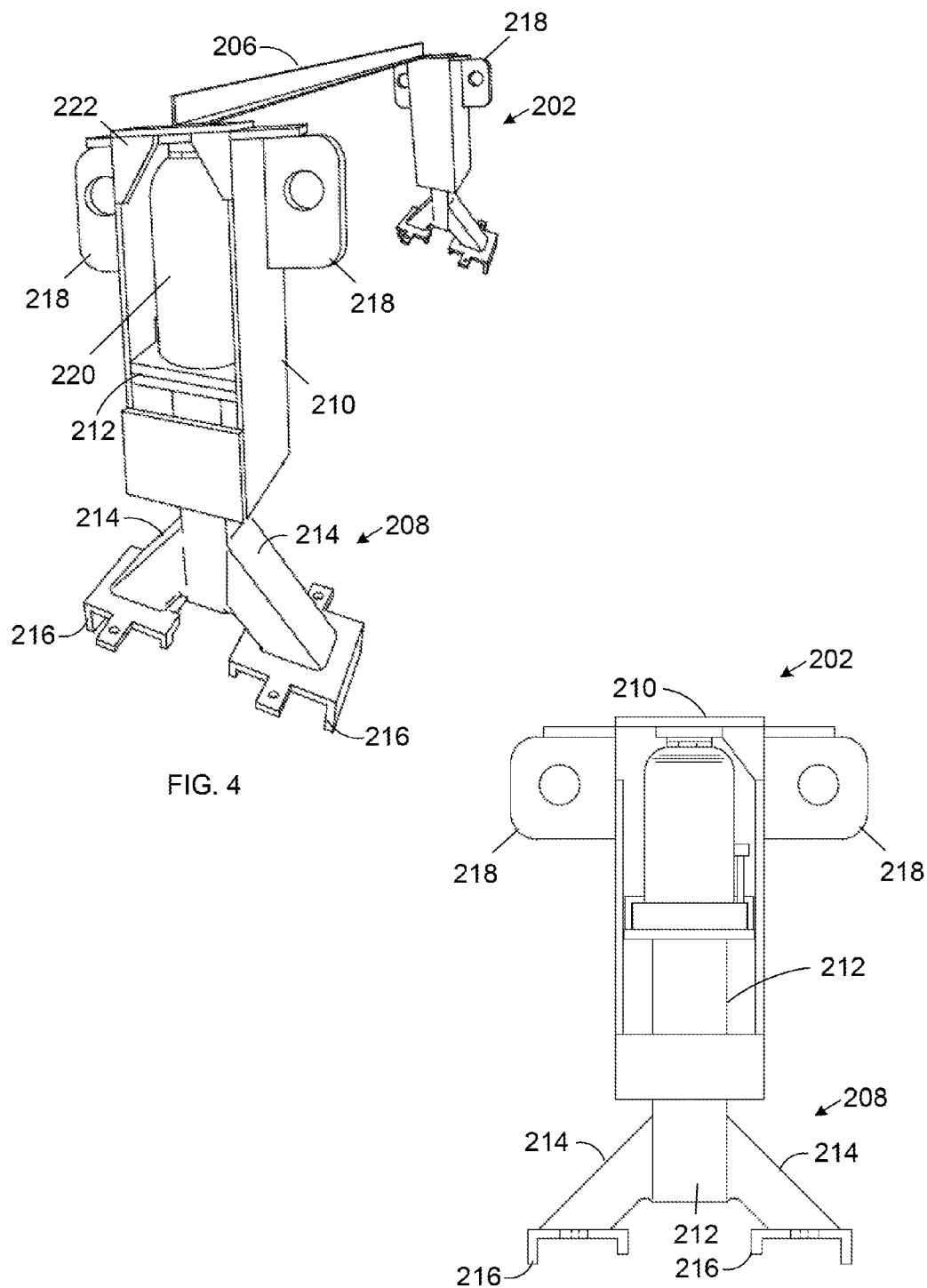
FIG. 4 is an orthographic view of a portion of the frame support shown in FIG. 3.
FIG. 5 is a side view of the stand assembly shown in FIGS. 3 and 4.

As best illustrated in FIG. 4, the illustrated stands 202 are also connected to each other by a brace member 206 arranged at the top of the stands. However, the brace member 206 may be arranged at other positions on the stands 202 and/or the frame support 200 may be provided without a brace member 206. Alternatively. tension members 202 may also be connected to the brace member 206 and/or any other number of stands 202 and/or tension members 204 may be provided. For example, a single stand 202 may be provided with the tension members 204 connected to the stand and/or a brace member 206 extending from near the top of the single stand.

Figure 6:
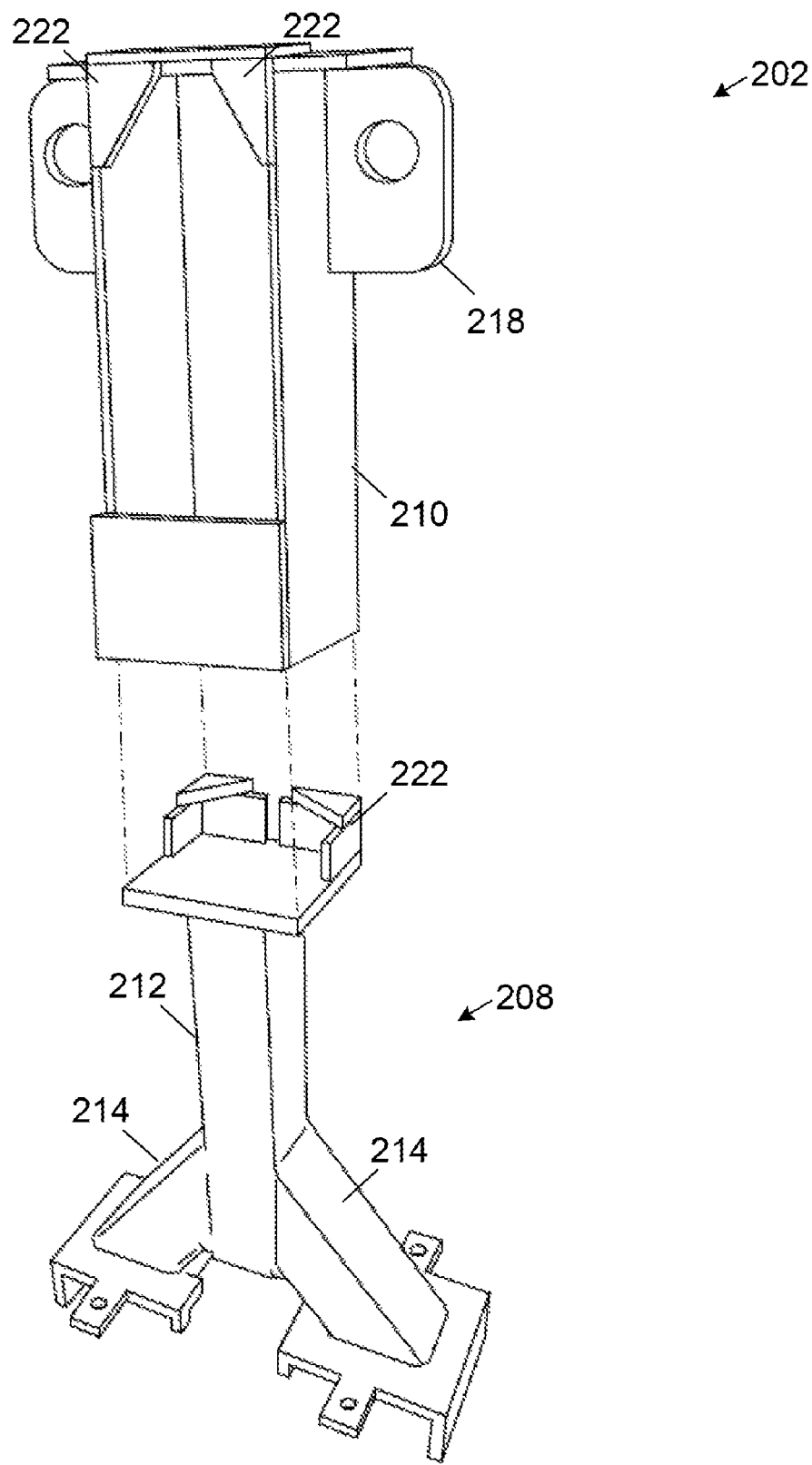
FIG. 6 is an exploded orthographic view of the stand assembly shown in FIG. 5.

As best illustrated in FIGS. 5 and 6, each of the illustrated stands 202 includes a base 208 which is supported by the bedplate 203, and a cap 210 for extending from the base 208. In these examples, each of caps 210 also include ears 218 on each side for connecting to the corresponding tension members 204. However, the tension members 204 may also be connected directly to caps 210 that are provided without the ears.

Each of the illustrated bases 208 includes a substantially vertical column 212 and two legs 214 for supporting the column 212 on the frame 132. However, the columns 212 may also be arranged in non-vertical orientations and/or any number of legs 214 may also be provided. The columns 212 may also be secured and/or formed directly on the bedplate 203, or rear frame 205, with or without the legs 214. Each of the illustrated legs 214 is also be provided with feet 216 for stabilizing and securing the base 208 to the bedplate 203.

As best illustrated in FIG. 6, each of the illustrated caps 210 slides over the top of the columns 212. As best shown in FIGS. 4 and 5, a jack 220 is arranged between the bottom of the cap 210 and the top of the column 212 for moving the cap relative to the column 212 and tensioning the tension members 204. However, other tensioning configurations may also be provided. For example, ratcheting chain load binders may be provided for tensioning the members 204.

The term "jack" is used here broadly to refer to any device or mechanism for applying a force between the cap 210 and the column 212. Although the a bottle jack 220 is illustrated here, screw, spring, hydraulic, pneumatic, mechanical, electrical, and other types of jacks may also be provided. In this configuration, the top of the column 212 and the cap 210 are also provided with flanges 222 for positioning the jack 220 on the stand 202.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A wind turbine, comprising:
   a tower;
   a nacelle arranged on the tower;
   a gearbox connected to an electrical generator arranged in the nacelle;
   a blade rotating the gearbox and driving the generator;
   a bedplate supporting the gearbox;
   a rear frame, extending from the bedplate, supporting the generator;
   at least one tension member extending between the rear frame and the bedplate;
   wherein the bedplate includes a stand extending therefrom the bedplate and the at least one tension member connects the stand to the rear frame;
   wherein the stand further comprises:
      a base; and
      a cap, connected to the at least one tension member, extending from the base; and
   a jack extending the cap from the base.

2. The wind turbine recited in claim 1, wherein the jack is arranged between the cap and the base.

3. The wind turbine recited in claim 1, wherein the jack is a bottle jack.

4. A wind turbine, comprising:
   a tower;
   a nacelle arranged on the tower;
   a gearbox connected to an electrical generator arranged in the nacelle;
   a blade rotating the gearbox and driving the generator;
   a bedplate supporting the gearbox;
   a rear frame, extending from the bedplate, supporting the generator;
   a first stand extending from one side of the bed plate;
   a first tension member extending between the first stand and the rear frame;
   a second stand extending from an opposite side of the bed plate opposite from the one side;
   a second tension member extending between the second stand and the rear frame;
   a third tension member extending to the bedplate from an opposite side of the first stand as the first tension member; and
   a fourth tension member extending to the bedplate from an opposite side of the second stand as the second tension member;
   wherein each stand further comprises:
      a base supported by the bedplate; and
      a cap, connected to the at least one tension member, for extending from the base; and
   wherein each column supports a jack extending the cap from the base.

5. The wind turbine recited in claim 4, wherein the jack is a bottle jack.

6. The wind turbine recited in claim 4, wherein each tension member comprises a chain.

7. The wind turbine recited in claim 4, wherein each base further comprises
   a substantially vertical column; and
   at least one leg supporting the substantially vertical column on the bedplate.

8. The wind turbine recited in claim 7, wherein each column supports a jack for extending the cap from the base.

9. The wind turbine recited in claim 8, wherein the jack is a bottle jack.

10. The wind turbine recited in claim 9, wherein each tension member comprises a chain.

* * * * *